(12) United States Patent
Sevinc et al.

(10) Patent No.: US 10,225,106 B2
(45) Date of Patent: Mar. 5, 2019

(54) EFFICIENT UPDATE OF PER-INTERFACE ADDRESS GROUPINGS

(71) Applicant: Nicira, Inc., Palo Alto, CA (US)

(72) Inventors: Soner Sevinc, San Francisco, CA (US);
Anupam Chanda, Los Altos, CA (US);
Pankaj Thakkar, Cupertino, CA (US);
Boon Ang, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 136 days.

(21) Appl. No.: 15/363,630

(22) Filed: Nov. 29, 2016

(65) Prior Publication Data

US 2018/0152321 A1 May 31, 2018

(51) Int. Cl.
| | |
|---|---|
| *G06F 15/173* | (2006.01) |
| *H04L 12/46* | (2006.01) |
| *H04L 12/715* | (2013.01) |
| *H04L 29/08* | (2006.01) |
| *H04L 29/12* | (2006.01) |

(52) U.S. Cl.
CPC .......... *H04L 12/4641* (2013.01); *H04L 45/64* (2013.01); *H04L 67/02* (2013.01); *H04L 67/10* (2013.01); *H04L 61/2069* (2013.01)

(58) Field of Classification Search
CPC . H04L 12/4641; H04L 45/64; H04L 61/2007; H04L 67/02; H04L 67/10
USPC .................................................. 709/223, 224
See application file for complete search history.

(56) References Cited

U.S. PATENT DOCUMENTS

| | | | |
|---|---|---|---|
| 2013/0019277 A1* | 1/2013 | Chang ................. | H04L 63/0218 726/1 |
| 2013/0031544 A1* | 1/2013 | Sridharan ............. | G06F 11/203 718/1 |
| 2013/0047151 A1* | 2/2013 | Sridharan ........... | G06F 9/45558 718/1 |
| 2014/0195666 A1* | 7/2014 | Dumitriu ............ | H04L 12/4625 709/223 |
| 2016/0112269 A1* | 4/2016 | Singh .................. | H04L 41/0853 709/224 |
| 2016/0191466 A1* | 6/2016 | Pernicha ................. | H04L 63/20 726/1 |

* cited by examiner

*Primary Examiner* — Philip B Tran
(74) *Attorney, Agent, or Firm* — Patterson & Sheridan, LLP (57) ABSTRACT

Certain embodiments described herein are generally directed to a hypervisor-wide data structure that holds service rule address information for multiple VIFs in a compact way, which can later be processed per-VIF, in order to perform VIF-specific address group updates. For example, certain embodiments described herein provide a network controller that maintains a global hash table for multiple VIFs that maps network addresses to groups of one or more service rules. In certain embodiments, a network address to service rules table for each VIF may be derived based on the global hash table by using set intersections.

20 Claims, 3 Drawing Sheets

EFFICIENT UPDATE OF PER-INTERFACE ADDRESS GROUPINGS

BACKGROUND

In computing, a firewall is a network security system that monitors and controls the incoming and outgoing network traffic (e.g., packets) based on predetermined security rules. A firewall often establishes a barrier between a trusted, secure network and external networks that are assumed not to be secure or trusted. Firewalls may be programmed with many rules specifying which packets to allow or drop, such as based on a network address associated with the packet (e.g., Internet protocol (IP) address of a source or destination of the packet).

A tenant in a software defined data center with virtualized networking may also want firewall services, which could be implemented in a distributed manner. Doing so may require the implementation of many firewall rules throughout the logical network in an efficient manner. As such, various optimizations are desirable to provide such firewall rules efficiently.

BRIEF SUMMARY

Herein described are one or more embodiments of a method for managing service rules. The method generally includes receiving a plurality of service rules, each service rule corresponding to one or more of a plurality of network addresses and at least one of a plurality of virtual interfaces (VIFs), and grouping the plurality of network addresses into non-overlapping groups of network addresses. The method also includes generating a global group for each of the plurality of network addresses, the global group including each of the plurality of service rules that include said each network address when the at least one service rule corresponds to the network address for any of the plurality of VIFs. The method further includes receiving an update to at least one of the plurality of service rules, and updating the non-overlapping groups of network addresses based on the global group.

Also described herein are embodiments of a computer-readable medium having instructions stored thereon for performing the method described above for managing service rules.

Also described herein is an apparatus for managing service rules. The apparatus generally includes means for performing the method described above for managing service rules.

The preceding Summary is intended to serve as a brief introduction to some embodiments of the invention. It is not meant to be an introduction or overview of all subject matter disclosed in this document. The Detailed Description that follows and the Drawings that are referred to in the Detailed Description will further describe the embodiments described in the Summary as well as other embodiments. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description, numerous details, examples, and embodiments are set forth and described. Certain embodiments relate to a data structure that holds service rule (e.g., firewall rule) network address (e.g., IP address) information for multiple VIFs implemented by a hypervisor running on a host, which is a physical computing device that supports execution of virtual machines or other virtualized computing instances. A VIF generally refers to a port on a virtual switch or logical switch, but may also refer to a virtual network interface card (NIC).

The data structure can later be processed per-VIF, in order to perform VIF-specific address group updates, as further discussed below. For example, certain embodiments relate to a network controller (e.g., implemented by the hypervisor on the host) that maintains a global hash table for multiple VIFs that maps network addresses to groups of one or more service rules. In certain embodiments, a network address to service rules table for mapping network addresses to service rules for each VIF may be derived based on the global hash table by using set intersections, as further discussed below.

Figure 1:
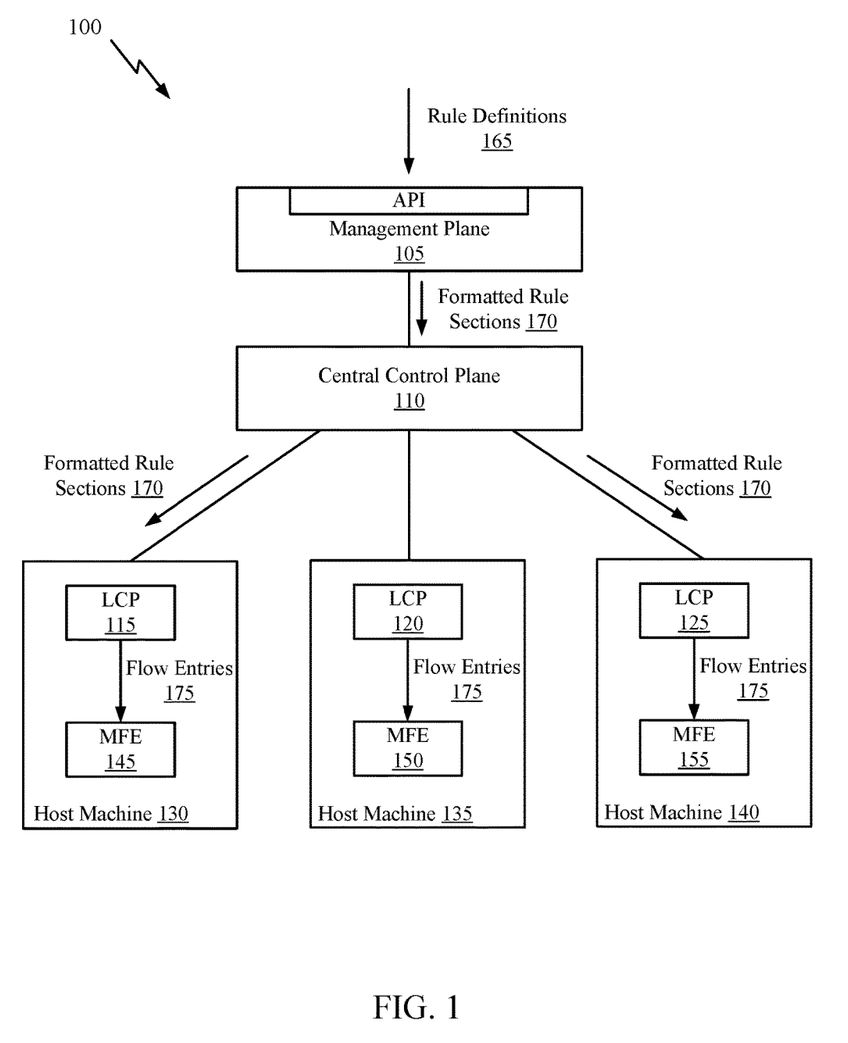
FIG. 1 illustrates a network control system, in accordance with certain embodiments described herein.

FIG. 1 illustrates a network control system 100, in accordance with certain embodiments described herein. Network control system 100 includes a management plane 105, a central control plane 110, and multiple local controllers (also called the local control plane (LCP)) 115-125 that operate on host machines 130-140. In addition, each of host machines 130-140 includes one or more a managed forwarding elements (MFEs) 145-155 (only one shown for each host) that process data traffic according to configuration information received from their respective LCP 115-125. For example, each of MFEs 145-155 may manage service rules for a plurality of VIFs on respective host machines 130-140. In some embodiments, each host machine 130-140 runs a hypervisor that implements the MFEs and LCPs on the host machine.

An MFE is a managed virtual switch that connects virtual machines (or other virtual computing instances) residing on a physical host computer to each other and the outside world. In certain embodiments, the MFE may forward packets to a virtual interface (VIF), a tunnel endpoint, or a broadcast medium (such as for virtual local area networks). For example, for virtual machines residing on logical overlay networks, which are network abstractions implemented using network tunneling protocols, the MFE ensures egress packets are properly encapsulated and forwarded to the correct tunnel endpoint and ingress packets are decapsulated and forwarded to the correct virtual machine.

Each MFE may manage service rules for a plurality of virtual interfaces (VIFs) that provide connections between the MFE and the virtual machines of the host. Virtual machines, MFEs, and VIFs running on the host may be implemented by a hypervisor. If the host runs containers or another form of virtualized computing instances, the MFEs, VIFs, etc., may be implemented and managed by the host operating system.

Though shown as single entities, it should be understood that both management plane 105 and central control plane 110 may be implemented as distributed or clustered systems. That is, management plane 105 may include multiple computers that implement management plane functions, and central control plane 110 may include multiple controller computers or virtual machines or containers (or other logical compute instances) that implement central control plane functions. In some embodiments, each such controller includes both management plane and central control plane functions (e.g., as separate applications or functions).

Management plane 105 of some embodiments is responsible for receiving logical network configuration inputs through an application programming interface (API) 160. Users may further input logical network configuration data through, e.g., a command-line interface, a graphical user interface such as a web interface, etc. In some embodiments, the network control system manages MFEs in a datacenter or other physical network that is virtualized, with numerous logical networks (for, e.g., numerous different applications and/or tenants) all implemented on the same physical infrastructure. Each logical network configuration, in some embodiments, may include configuration data defining one or more logical forwarding elements, such as logical switches, logical routers, etc. This configuration data may include information describing the logical ports (e.g., assigning MAC and/or IP addresses to logical ports) for these logical forwarding elements, how the logical forwarding elements interconnect, etc. In addition, logical network configuration data may include service rule definitions 165, such as distributed firewall rules, for the logical network.

Management plane 105 receives this logical network configuration data and generates desired state data that specifies how the logical network should be implemented in the physical infrastructure. In some embodiments, this data includes descriptions of the logical forwarding elements in a uniform format (e.g., as a set of database records, or a different format). Management plane 105 of some embodiments is responsible for translating API calls (e.g., to create, update, or delete) into modifications to the desired state, and for sending this desired state to central control plane 110.

As illustrated, this desired state data may include formatted rule sections 170 for the service rules. In some embodiments, the service rules are organized in sets based on different characteristics. For instance, in some embodiments the network administrator that defines the service rules also defines how the rules are organized. As examples, the rules might be organized with all layer 2 (L2) rules in a first set and all layer 3 (L3) rules in a second set, or with separate sets for each logical L2 switch and each logical L3 router. Other forms of organization, such as all http-related rules in one set and all ssh-related rules in another set, may be used as well. These sets of service rules (also referred to as rule sections) may be organized with priorities, from a highest-priority rule section to a lowest-priority rule section. In addition, within each rule section, the service rules themselves may be organized from a highest-priority rule to a lowest-priority rule.

Central control plane 110 of some embodiments receives the desired state and is responsible for pushing that desired state to the appropriate host machines (that will realize this state). In some embodiments, each logical network is implemented on a subset of the physical infrastructure (e.g., a subset of the managed forwarding elements operating on host machines of the physical infrastructure). For example, if virtual machines that connect through a particular logical network reside on five of ten host machines, then some embodiments only implement the logical network on those five host machines. Central control plane 110 may send the state data for that logical network to LCPs operating on these host machines. As illustrated, this may include sending formatted rule sections 170 to LCPs 115 and 125, but not to LCP 120 as host machine 135 may not host any VMs that connect to this logical network, and thus its MFE 150 may not need to implement these rules.

LCPs 115-125 may be responsible for translating formatted rule sections into configuration data formatted for the MFE operating on their respective hosts. In some embodiments, the LCP is a daemon that operates in or on behalf of the virtualization software of the host machine, as does the MFE. For example, they may reside in kernel and/or user space provided by the hypervisor kernel, or a privileged VM such as domain zero, or parent- or root-partition. In other embodiments, the LCP and MFE may operate within an operating system that hosts multiple containers for one or more logical networks. Where a VM hosts multiple containers, a first LCP and MFE operate in the virtualization software on the host machine while a second LCP and MFE operate in the container host (or multiple such controllers/MFE operate in multiple container host VMs).

In addition, while in some embodiments all MFEs in the physical infrastructure are of the same type (and thus require data in the same format), in other embodiments the physical infrastructure may include multiple different types of MFEs. For instance, some embodiments include both hosts with kernel virtual machine (KVM) virtualization software with a flow-based MFE (e.g., Open vSwitch) and hosts with ESX virtualization software with feature-based MFEs. Such different types of MFEs may use different data formats from the LCP. In the example of FIG. 1, the LCPs 115 and 125 both manage flow-based MFEs 145 and 155, and thus these LCPs generate flow entries 175 for distribution to the MFEs. These flow entries are generated for the service rule sections 170 in such a way as to (i) reduce the number of flow entries for service rules and (ii) reduce the amount of churn in the flow entries caused by changes to the service rules.

Figure 2:
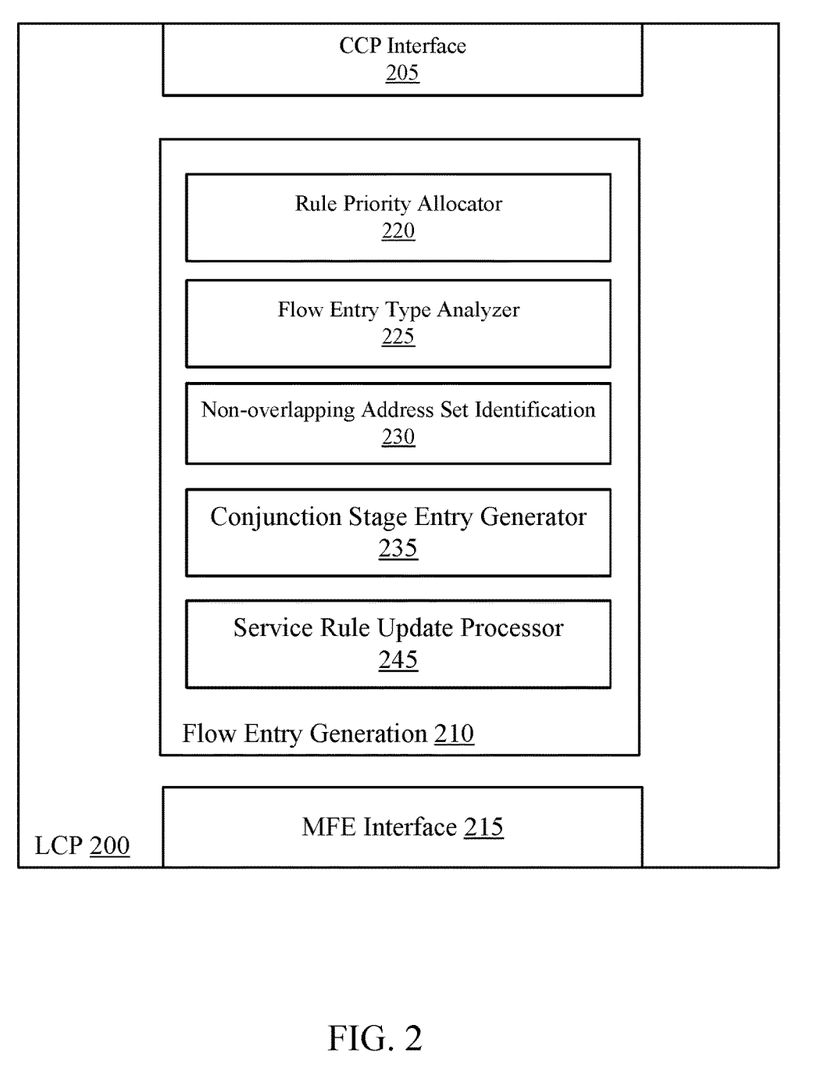
FIG. 2 illustrates the architecture of a local controller (also called the local control plane (LCP)), in accordance with certain embodiments described herein.

FIG. 2 conceptually illustrates the architecture of a LCP 200 that manages a flow-based MFE, in accordance with certain embodiments described herein. It should be understood that this diagram may not include all features of such a LCP, but instead relates specifically to those modules that perform functions related to generating flow entries for service rules to be implemented by the MFE. As shown, LCP 200 includes a central control plane interface 205, a flow entry generator 210, and a managed forwarding element interface 215. Central control plane (CCP) interface 205 receives logical network configuration data, including service rule data, from one or more central controllers. For example, different central controllers may handle the data for different logical networks, and in the case of controller failure new controllers may take over responsibility from the failed controller.

MFE interface 215 handles interactions with the MFE on the local host (e.g., in the virtualization software). That is, the data generated by the LCP is pushed to the MFE via this interface 215, based on the type of MFE instantiated on the host. In addition, MFE interface 215 receives data from the MFE (e.g., physical port numbers, etc.) which the LCP may use to calculate additional configuration data for the MFE (e.g., flow entries) in addition to passing the data up to the central control plane via CCP interface 205.

Flow entry generator 210 generates configuration data (flow entries, in this case) for the MFE. While the flow entry generator 210 may include various functions, this figure illustrates certain modules related to the efficient generation of flow entries for service rules, such as distributed firewall rules. Specifically, flow entry generator 210 includes a rule priority allocator 220, a flow entry type analyzer 225, a non-overlapping address set identification module 230, and a conjunction stage flow entry generator 235.

In certain embodiments, to accommodate the structure of the flow-based MFEs of some embodiments, priority allocator 220 may flatten the received rule sections into a single list from a highest-priority service rule to a lowest-priority service rule. The priority allocator 220 may start with the highest-priority rule section, and assign those service rules the highest priorities, then proceeds to the next-highest-priority rule section and assign those service rules the next highest priorities, and so on through the lowest-priority rule section, with the lowest priority assigned to the lowest-priority service rule in the lowest-priority rule section.

However, simply flattening the priorities into a single list from 1-N may create substantial churn when new service rules are added. For instance, if the rules were organized from priority 1 (highest-priority rule) to priority 1000 and a new service rule was added between the priority 10 and priority 11 service rules, then the priorities of the service rules from 11-1000 would need to be modified. This would use significant network controller resources, in addition to causing substantial transaction resources and time to change all of the flow entries at the MFE.

Instead, priority allocator 220 of some embodiments assigns the priority values in a manner designed to reduce re-assignment of priorities when changes are received to the service rules. This is complicated by the MFEs of some embodiments having a constrained space for priority assignment. For example, some MFEs have a 16-bit allocation for flow entry priority values, and thus the service rules for a particular logical network can have a maximum of 65,536 different priorities. Some embodiments divide the priority space into three contiguous subsets, with the highest and lowest priority values (e.g., 1000 highest and 1000 lowest) left unassigned initially. Within the middle subset, the network controller spaces the service rules when assigning priority values. For example, if the middle subset has 10000 possible priority values and there are 500 service rules, some embodiments assign every $20^{th}$ priority value to a service rule. Other embodiments may use two different spacing values, with a smaller spacing left between service rules within the same rule section and a larger spacing left between the lowest-priority service rule of a first rule section and the highest-priority service rule of the next rule section. This latter option allows for flexibility if rules are added/changed/removed within a rule section, while also providing for additional flexibility if rules are added at the beginning or end of a rule section or if a completely new rule section is added in between two previously-existing rule sections.

When LCP 200 receives new service rules (e.g., based on changes made by a network administrator), priority allocator 220 identifies the location in the list for the new rules, and assigns priority values while minimizing the number of other rules affected by the change. Thus, for example, if a single new rule is added between a first service rule assigned to priority X and a second service rule assigned to priority X+20, then the new rule may be assigned to priority X+10. In a more complicated case, if fifteen new rules are added in between a rule with priority X and a rule with priority X+10, then clearly the priority values for some of the rules will need to be changed. For example, if the rule with a next highest priority than priority X (i.e., lower priority value) is X−10, but the rules with the next lowest priorities after priority X+10 have priorities of X+11, X+12, and X+13, then it may affect fewer rules to move the priority X rule to priority X−6 and fit the new rules between priority X−6 and priority X+10. Some embodiments account for additional factors, such as the number of flow entries used to implement each rule, with a preference for modifying the priorities of rules that have fewer corresponding flow entries.

Once priority allocator 220 assigns priority values to the service rules, the other modules of the configuration data generator then generate configuration data for the MFE (e.g., flow entries, for a flow-based MFE). In the MFE of some embodiments, flow entries within a table (or sub-table) have priorities, such that if a packet matches more than one flow entry in a stage, the MFE may execute the actions of the highest-priority matching flow entry on the packet. Some embodiments use a single stage of flow entries for the service rules (e.g., with one flow entry per service rule), while other embodiments use multiple stages of flow entries.

Specifically, in some embodiments, the service rules include matches over multiple parameters (e.g., source (src) network address (e.g., media access control (MAC) or internet protocol (IP) address), destination (dst) network address, source transport layer port, and destination transport layer port) and the service rules may correspond to different VIFs. While a service rule can match over a single value for each parameter or multiple values for one or more of the parameters, the MFEs may use flow entries with a single value for each parameter. Thus, multiple flow entries may be used for service rules with multiple possible values for each parameter. As a simple example, a service rule with two possible values for a first parameter and one value for each of the other parameters may use two flow entries. For example, Rule 1 may include src addresses of {.1, .2} and a dst address of {.3}, which may be processed using two flow entries.

However, for service rules with large numbers of possible parameter values, this can lead to a massive number of flow entries. If a service rule has five possible source addresses, seven possible destination addresses, fifty possible source ports, and twenty-five possible destination ports, then simply taking the product of these parameters leads to 5*7*50*25=43,750 flow entries for a single service rule. In some cases, to solve this problem, a conjunctive matching technique may be used that allows a packet to be conjunctively matched across multiple parameters. In this case, a conjunction action ties groups of individual flows into higher level "conjunctive flows." Each group corresponds to one dimension (e.g., one of source address, destination address, source port, destination port, etc.), and each flow within the group matches one possible value for the dimension. A packet that matches one flow from each group matches the conjunctive flow. According, one flow entry is added for each possible value of each dimension corresponding to a conjunction identifier of the higher level conjunctive flow and a value corresponding to the flow's dimension. Thus, the number of flow entries is equal to the number of unique parameter values across each of the dimensions. In the example above, this would only require 5+7+50+25+1=88 flow entries, a significant savings. Thus, the flow entry type analyzer 225 may identify, for each service rule, whether to implement the service rule using a single stage of flow entries or whether to use a conjunctive match technique that may use multiple stages of flow entries. In some embodiments, if at least two of the parameters of the service rule include two or more possible values, then the LCP will use the conjunctive matching technique.

In some embodiments, non-overlapping address set identification module 230 uses address set normalization to further simplify the set of flow entries to push to the MFE. Address set normalization, for each of the source and destination address parameters, identifies sets of addresses that are treated the same within all of the service rules, and groups these sets into non-overlapping groups that are each treated the same within the flow entries. For instance, if two source addresses are matched by the same five service rules, then these addresses can be assigned an identifier. Before the packet processing stage for matching source addresses, a packet may be processed through a stage that matches its source address to a group identifier, which the MFE matches over at the source address processing stage rather than matching over the actual addresses.

For example, the network controller may receive a group of service rules for implementation by the MFE, with each service rule matching over a set of addresses (e.g., a source address and a destination address). For each of the source and destination addresses, these groups may be partially overlapping. For instance, rule A might match over the set of addresses {K, L, M}, while rule B matches over the set of addresses {K, L, N}. In this case, the network controller would flatten these addresses, then identify three groups of addresses: {K, L} (for both service rules), {M} (for service rule A), and {N} (for service rule B). Thus, the first stage of packet processing relevant to these rules would assign a first group identifier to packets with address K or L, a second group identifier to packets with address M, and a third group identifier to packets with address N.

As another example, non-overlapping address set identification module 230 may receive the service rules shown in table 1.

TABLE 1

| Rule 1 | src = {.1, .2, .3, .4, .5, .6, .7, .8} | dst = {.5, .6, .7, .8, .9, .10, .11, .12} |
|---|---|---|
| Rule 2 | src = {.1, .2, .3, .4, .9, .10, .11, .12} | dst = {.9, .10, .11, .12} |

Each of addresses .1 to .12 corresponds to one or more network addresses (e.g., IP addresses). Non-overlapping address set identification module 230 may determine non-overlapping address groups for Rule 1 and Rule 2. The non-overlapping address groups may include {.1, .2, .3, .4} from src addresses of Rule 1 and Rule 2, {.5, .6, .7, .8} for src and dst addresses of Rule 1, and {.9, .10, .11, .12} from the src and dst addresses of Rule 1 and Rule 2. Then, non-overlapping address set identifier module 230 may assign an identifier to each of the non-overlapping address groups. For example, non-overlapping address set identification module 230 may assign identifier 1 to the address group {.1, .2, .3, .4}, assign identifier 2 to the addresses group {.5, .6, .7, .8}, and may assign identifier 3 to address group {.9, .10, .11, .12}. Thus, Rule 1 and Rule 2 may be reduced as shown in table 2.

TABLE 2

| Rule 1 | src = {1, 2} | dst = {2, 3} |
|---|---|---|
| Rule 2 | src = {1, 3} | dst = {3} |

Based on this grouping, the total number of flow entries corresponding to Rule 1 and Rule 2 can be reduced. For example, the total number of flow entries based on this grouping may be equal to 18 flow entries (e.g., 12 flow entries for encoding mappings as the rules include 12 different addresses+4 flow entries to realize Rule 1+2 flow entries to realize Rule 2). In particular, the number of flows to implement a Rule may be the lesser of the sum of the number of source addresses and destination addresses or the product of the number of source addresses and the number of destination addresses. The number of flow entries for encoding mappings may be equal to the sum of the number of addresses corresponding to each identifier. However, without the address grouping, the total number of flow entries would be equal to 28. Thus, by grouping the addresses, the total number of flow entries is reduced by 10. In certain embodiments described herein, the non-overlapping address set identification module 230 may perform the address set normalization over service rules corresponding to multiple VIFs to further reduce the number of flow entries, as will be described in more detail herein. For example, in certain embodiments, the grouping of network addresses may be performed over service rules corresponding to multiple VIFs.

In certain embodiments, conjunction stage flow entry generator 235 generates the staged flow entries once address set normalization has been performed. Conjunction stage flow entry generator 235 generates flow entries for assigning identifiers to packets based on the source and/or destination addresses, as well as the conjunction stages that match each parameter and a final stage for determining whether all of the conditions are met for any particular rule. In some embodiments, the non-conjunctive (single stage) flow entries are generated using the normalized address sets as well.

Once the network controller assigns priority values to the rules, the controller then generates the configuration data for the MFE. For a flow-based MFE, this configuration data is flow entries used by the MFE to implement the service rules (as well as other embodiments of the logical network). In the MFE of some embodiments, flow entries within a table (or sub-table) have priorities, such that if a packet matches more than one flow entry in a stage, the MFE may execute the actions of the highest-priority matching flow entry on the packet (thus the assignment of flattened priority values to the rules). Some embodiments use a single stage of flow entries for the service rules (i.e., with one flow entry per service rule), while other embodiments use multiple stages of flow entries.

In certain aspects, the LCP 200 also includes a service rules update processor 245. For example, one or more service rules may be updated and the address grouping generated by non-overlapping address set identification module 230 may have to be updated based on the updated service rules. Service rule update processor 245 may update the address groupings as described below in more detail.

Example Technique for Updating of Per-Interface Address Groupings

Embodiments described herein provide a data structure that holds service rule address information for multiple VIFs in a compact way, which can later be processed per-VIF, in order to perform VIF-specific address group updates. In this manner, a memory versus computation trade-off may be applied that can save a large amount of memory with a small penalty of extra computation on this data structure. For example, embodiments described herein provide techniques for creating and updating address groupings for multiple VIFs at the same time (e.g., there may be 50 VIFs in a hypervisor).

First, updating of service rules for a single VIF is explained to facilitate understanding of the memory overhead involved with updating address groupings even for a single VIF. For example, at time (t=0), service rules update processor 245 may receive four service rules R1, R2, R3, and R4 that may be applied to a first VIF (VIF1). While this example focuses on the source (src) network addresses of the service rules, the same techniques can be applied for destination (dst) network addresses. Service rules update processor 245 may receive rules R1, R2, R3, and R4 corresponding to the source addresses shown in table 3.

TABLE 3

| Rule 1 | src = {.1, .2, .3, .4, .5, .6, .7, .8} |
|---|---|
| Rule 2 | src = {.5, .6, .7, .8, .9, .10, .11, .12} |
| Rule 3 | src = {.1, .2, .3, .4, .9, .10, .11, .12} |
| Rule 4 | src = {.9, .10, .11, .12} |

As presented above, service rules update processor 245 may use an address grouping algorithm to map the groups of network addresses to integer group IDs. For example, network addresses {.1, .2, .3, .4} may be assigned identifier 1, network addresses {.5, .6, .7, .8} may be assigned identifier 2, and network addresses {.9, .10, .11, .12} may be assigned identifier 3. Thus, the service rules can be reduced as shown in table 4.

TABLE 4

| Rule 1 | src = {1, 2} |
|---|---|
| Rule 2 | src = {2, 3} |
| Rule 3 | src = {1, 3} |
| Rule 4 | src = {3} |

At time (t=1), service rules update processor 245 may receive updated service rules. For example, service rules R3 and R4 may be deleted, and service rules R5 and R6 may be added, as shown in table 5.

TABLE 5

| Rule 5 | src = {.7, .8, .9, .10, .11, .12} |
|---|---|
| Rule 6 | src = {.1, .2, .3, .4, .5, .6} |

Service rules update processor 245 handles the updates of the service rules by keeping a hash table as a redundancy, and computing the differences between the old service rules and the new service rules over the hash table. It is also possible for service rules update processor 245 to recompute all the groups of the hash table from scratch based on the updated set, but since updates generally impact a much smaller number of service rules than the total number of existing service rules, it may be faster to apply an incremental method. The hash table maps addresses to the rule IDs. For example, the hash table (e.g., network address to service rules table) at time (t=0) may be as shown in table 6.

TABLE 6

| Network address: .1 | {R1, R3} |
|---|---|
| Network address: .2 | {R1, R3} |
| Network address: .3 | {R1, R3} |
| Network address: .4 | {R1, R2} |
| Network address: .5 | {R1, R2} |
| Network address: .6 | {R1, R2} |
| Network address: .7 | {R1, R2} |
| Network address: .8 | {R1, R2} |

TABLE 6-continued

| Network address: .9 | {R2, R3, R4} |
|---|---|
| Network address: .10 | {R2, R3, R4} |
| Network address: .11 | {R2, R3, R4} |
| Network address: .12 | {R2, R3, R4} |

Addresses with the same values in the hash map are in the same group. As can be seen above, network addresses .1, .2, .3 and .4 are in group "{R1, R3}" with assigned identifier 1, network addresses .5, .6, .7, and .8 are in group "{R1, R2}" with assigned identifier 2, and network addresses .9, .10, .11, and .12 are in group "{R2, R3, R4}" with assigned identifier 3.

At time (t=1), when rule changes occur, service rules update processor 245 updates the hash map by adding/removing rules for addresses belonging to changed service rules. For example, service rule R3 is removed from network address ".1", and "R6" is added instead, and so on. Thus, the new hash table at time (t=1) may be as shown in table 7.

TABLE 7

| Network address: .1 | {R1, R6} |
|---|---|
| Network address: .2 | {R1, R6} |
| Network address: .3 | {R1, R6} |
| Network address: .4 | {R1, R6} |
| Network address: .5 | {R1, R2, R6} |
| Network address: .6 | {R1, R2, R6} |
| Network address: .7 | {R1, R2, R5} |
| Network address: .8 | {R1, R2, R5} |
| Network address: .9 | {R2, R5} |
| Network address: .10 | {R2, R5} |
| Network address: .11 | {R2, R5} |
| Network address: .12 | {R2, R5} |

As a result, service rules update processor 245 generates a hash table for the old groups of service rules (old_groups table) and a hash table for the new groups of service rules (new_groups table). Service rules update processor 245 may use these tables to move addresses from their previous group to their new groups. For example, the old_groups table and the new_groups table may be as follows:

| New-Groups Table | |
|---|---|
| Address: .1 | {R1, R6} |
| Address: .2 | {R1, R6} |
| . . . | |
| Address: .7 | {R1, R2, R5} |

| Old-Groups Table | |
|---|---|
| Address: .1 | {R1, R3} |
| Address: .2 | {R1, R3} |
| . . . | |
| Address: .7 | {R1, R2} |

Thus, service rules update processor 245 moves network address .1 from group {R1, R3} to group {R1, R6}, and so on. The new groups for the VIF may then be assigned identifiers for each unique group for the VIF, and the service rules for the VIF may be reduced using the new assigned identifiers. For example, the new groups may be {R1, R6} assigned identifier 1, {R1, R2, R6} assigned identifier 2, {R1, R2, R5} assigned identifier 3, and {R2, R5} assigned identifier 4. Thus, the service rules can be reduced as shown in table 7.

TABLE 7

| | |
|---|---|
| Rule 1 | src = {1, 2, 3} |
| Rule 2 | src = {2, 3, 4} |
| Rule 3 | src = {3, 4} |
| Rule 4 | src = {1, 2} |

The old_groups table and the new_groups table may not include all network addresses in the hash table, but only the network addresses that have changed due to the service rules update. In a hypervisor, there may be more than 50 VIFs and many service rules may be common among the VIFs. Thus, a significant amount of information may be duplicated in memory to handle updates for individual VIFs.

Certain embodiments described herein are generally directed to handling address grouping updates for multiple VIFs. For example, service rules update processor 245 may maintain a global hash table for multiple VIFs, as opposed to a hash table for each VIF. Service rules update processor 245 also maintains information regarding which rules are applied to which VIFs. The service rules table for each VIF may be derived based on the global hash table by using set intersections, as will be described in more detail herein. By maintaining the global hash map for multiple VIFs, the amount of memory used in updating service rules for each VIF is reduced.

Figure 3:
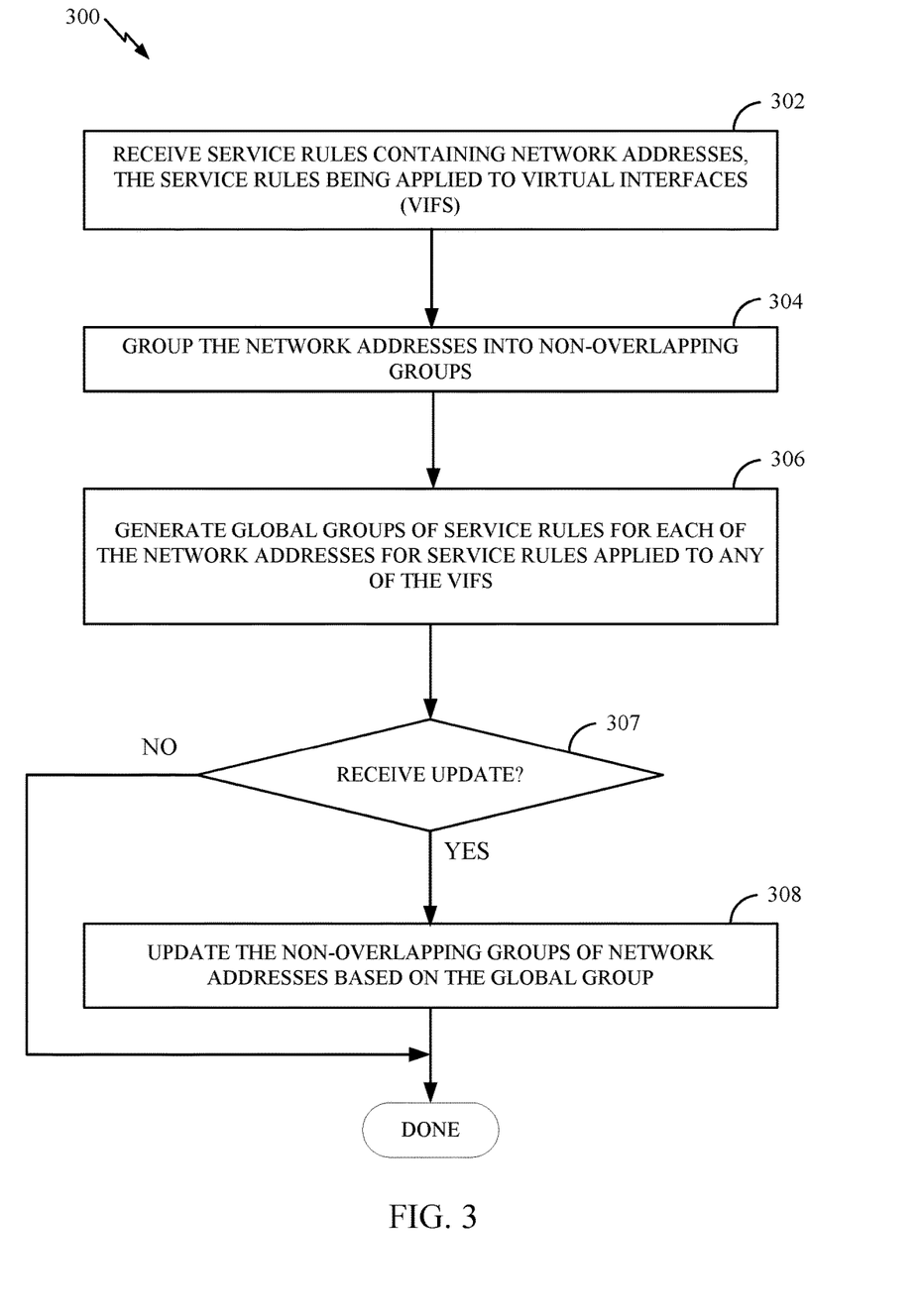
FIG. 3 is flow diagram of example operations for managing service rules, in accordance with certain embodiments described herein.

FIG. 3 is a flow diagram of example operations 300 for managing service rules, in accordance with certain embodiments described herein. In some embodiments, operations 300 may be performed by a network controller such as non-overlapping address set identification module 230 and service rules update processor 245.

The operations 300 begin, at block 302, by receiving service rules containing network addresses, the service rules being applied to VIFs. At block 304, the non-overlapping address set identification module 230 may group the network addresses into non-overlapping groups. At block 306, service rules update processor 245 may generate a global group of service rules for each of the network addresses for service rules applied to any of the VIFs. At block 307, an update to the service rules may be received by the service rules update processor 245. If not, the operations 300 may end. Otherwise, at block 308, the service rules update processor 245 may updated the non-overlapping groups of network addressed based on the global group.

Operations 300 are explained in more detail by way of example. When service rules arrive at a hypervisor, the service rules may have "applied_to" fields in addition to the source and/or destination fields. For example, service rules update processor 245 of the hypervisor may receive, at time (t=0), service rules R1, R2, R3, R4 having the "applied-to" fields as shown in table 8.

TABLE 8

| | |
|---|---|
| Rule 1 | applied_to = {VIF1, VIF2, VIF7} |
| Rule 2 | applied_to = {VIF1, VIF5, VIF9} |
| Rule 3 | applied_to = {ALL} |
| Rule 4 | applied_to = {VIF1, VIF6, VIF7, VIF8} |

Like in the previous example, service rules R1, R2, R3, R4, R5, and R6 include the source addresses as shown in table 9.

TABLE 9

| | |
|---|---|
| Rule 1 | src = {.1, .2, .3, .4, .5, .6, .7, .8} |
| Rule 2 | src = {.5, .6, .7, .8, .9, .10, .11, .12} |

TABLE 9-continued

| | |
|---|---|
| Rule 3 | src = {.1, .2, .3, .4, .9, .10, .11, .12} |
| Rule 4 | src = {.9, .10, .11, .12} |
| Rule 5 | src = {.7, .8, .9, .10, .11, .12} |
| Rule 6 | src = {.1, .2, .3, .4, .5, .6} |

It should be noted that if service rules update processor 245 was to create separate hash tables per VIF, all the hash map tables would potentially be different, as not all rules are present at all VIFs. In certain embodiments described herein, service rules update processor 245 generates a global hash table by disregarding the "applied-to" fields of the service rules and uses the global hash map table to update an existing hash table. In other words, to facilitate understanding, it could be assumed that an imaginary "global VIF" exists that contains all the service rules in the hypervisor. A service rule is added to this global hash table if it is applied to at least one VIF in the hypervisor, and removed if it is removed from all VIFs in the hypervisor.

Service rules update processor 245 may also generate VIF specific "new_groups" and "old_groups" when service rules are added and/or deleted or the "applied-to" fields of the service rules change. If only the "applied-to" fields are changed, the global hash table may not change. For rule additions and/or deletions, service rules update processor 245 may, for each VIF, compute an "old_groups" table and a "new_groups." The rules of old group of address A at VIF_i may be equal to {rules of old group of address A of global VIF} intersection with {previous rules at VIF_i}. Moreover, the rules of new group of address A at VIF_i may be equal to {rules of new group of address A of global VIF} intersection with {new rules at VIF_i}.

For example, at time (t=1), service rules R3 and R4 may be deleted, and new service rules R5 and R6 may be added with "applied-to" fields, as shown in table 10.

TABLE 10

| | |
|---|---|
| Rule 5 | src = {.7, .8, .9, .10, .11, .12} |
| Rule 6 | src = {.1, .2, .3, .4, .5, .6} |

In this case, at VIF7 for example, service rules update processor 245 may generate an "old_groups" table and a "new_groups" table shown in table 11.

TABLE 11

| | |
|---|---|
| address .1's old group | {R1, R3} intersect {R1, R3, R4} = {R1, R3} |
| address .1's new group | {R1, R6} intersect {R1, R5} = {R1} |
| ... | |
| address .5's old group | {R1, R2} intersect {R1, R3, R4} = {R1} |
| address .5's new group | {R1, R6} intersect {R1, R5} = {R1} |
| ... | |
| address .12's old group | {R2, R3, R4} intersect {R1, R3, R4} = {R3, R4} |
| address .12's new group | {R2, R5} intersect {R1, R5} = {R5} |

Determining the intersection between two network address groups may involve determining overlapping service rules between the two network address groups. Note that, not all network address group changes in the global hash table lead to a network address group change in a particular VIF, as is the case for network address .5 at VIF7, which remained in group {R1} after the update. However, for network address .12, VIF7 is removed from network address group {R3, R4}, and added to network address group {R5}. In certain embodiments, new identifiers may be assigned to the new groups, and the service rules for the VIF may be reduced using the new identifiers. For example, the services rules for VIF7 can be reduced as shown in table 12.

TABLE 12

| Rule 1 | src = {1, 2} |
|---|---|
| Rule 5 | src = {2, 3} |

As shown, network addresses {.1, .2, .3, .4, .5, .6} are in group {R1} assigned identifier 1, network addresses {.7, .8} are in group {R1, R5} assigned identifier 2, and network addresses {.9, .10, .11, .12} are in group {R5} assigned identifier 3.

In some cases, a service rule update can cause new VIFs to be added to a service rule's "applied-to" field. Such an update may not cause any change in the global hash table, however, old and new network address groups may be computed for the newly added VIFs. For example, if a certain VIF (VIF_i) has extra added service rules, service rules update processor 245 may iterate through the global hash table entry values that contain any of the extra rules, and compute the old group and the new group for any addresses that contain any of the extra rules. For example, the rules of old group of address A at VIF_i may be equal to {rules of address A of global VIF} intersection with {previous rules at VIF_i}, and the rules of new group of address A at VIF_i may be equal to {rules of address A of global VIF} intersection with {new rules at VIF_i}. For example, if there is another update of service rules at time (t=2) that adds VIF7 to service rule R2, the "applied-to" field of service rule R2 may become {VIF1, VIF5, VIF9, VIF7}.

In this case, the hash table of VIF7 may map network addresses .5 to .12 to rule R2. Therefore, service rules update processor 245 may compute the intersection for each of the network addresses .5 to .12. For example, the old group and the new group for network address .7 may be as shown in table 13.

TABLE 13

| address .7's old group | {R1, R2, R5} intersect {R1, R5} = {R1, R5} |
|---|---|
| address .7's new group | {R1, R2, R5} intersect {R1, R2, R5} = {R1, R2, R5} |

As another example, the old group and the new group for network address .12 may be as shown in table 14.

TABLE 14

| address .12's old group | {R2, R5} intersect {R1, R5} = {R5} |
|---|---|
| address .12's new group | {R2, R5} intersect {R1, R2, R5} = {R2, R5} |

In certain embodiments, new identifiers may be assigned to the new groups, and the service rules for VIF7 may be reduced using the new identifiers.

In some cases, one or more VIFs may be deleted from the "applied-to" field of service rules. For example, there may be service rules that are deleted form a certain VIF (VIF_i), but are still present in the hypervisor. In this case, service rules update processor 245 iterates over each network address group of VIF_i, and if the network address group contains any one of the extra deleted rules, then service rules update processor 245 moves all addresses in that network address group into their new network address group. For example, the rules of old group of address A at VIF_i may be equal to {rules of address A currently at VIF_i}, which is the equivalent of {rules of address A of global VIF} intersection with {previous rules at VIF_i}. Moreover, the rules of new group of address A at VIF_i may be equal to {rules of address A of global VIF} intersection with {new rules at VIF_i}.

For example, if VIF7 is erased from service rule R5's "applied_to" field, all groups of VIF7 that contain R5 would change. The addresses that are in service rule groups that include service rule R5 can form a new group, or join other existing groups. For example, the old group and the new group for network address .7 may be as shown in table 15.

TABLE 15

| address .7's old group | {R1, R2, R5} intersect {R1, R2, R5} = {R1, R2, R5} |
|---|---|
| address .7's new group | {R1, R2, R5} intersect {R1, R2} = {R1, R2} |

In certain embodiments, new identifiers may be assigned to the new groups, and the service rules for VIF7 may be reduced using the new identifiers.

Certain embodiments described herein may be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While certain embodiments described herein have been described with reference to numerous specific details, one of ordinary skill in the art will recognize that the invention can be embodied in other specific forms without departing from the spirit of the invention. The operations of FIG. 3 may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for managing service rules, comprising:
   receiving, at one or more physical computing devices, a plurality of service rules, each service rule corresponding to one or more of a plurality of network addresses and at least one of a plurality of virtual interfaces (VIFs) associated with a plurality of virtual computing instances running on a first physical computing device;
   grouping, by the one or more physical computing devices, the plurality of network addresses into non-overlapping groups of network addresses;
   generating, by the one or more physical computing devices, a global table comprising a plurality of entries, each entry mapping a different one of the plurality of network addresses to a corresponding global group including each of the plurality of service rules that correspond to both the network address and to any of the plurality of VIFs;
   storing, at the one or more physical computing devices, the global table:
   receiving, at the one or more physical computing devices, an update to at least one of the plurality of service rules;
   in response to receiving the update;
      determining, by the one or more physical computing devices, previous service rules corresponding to a first VIF of the plurality of VIFs based on the plurality of service rules;
      determining, by the one or more physical computing devices, updated service rules corresponding to the first VIF based on the update;
      generating, by the one or more physical computing devices, one or more VIF specific tables for the first VIF based on the stored global table, the previous service rules, and the updated service rules as opposed to storing a VIF specific table prior to receiving the update; and
      updating, by the one or more physical computing devices, the non-overlapping groups of network addresses based on the one or more VIF specific tables.

2. The method of claim 1, wherein the plurality of VIFs correspond to ports on a virtual switch running on the first physical computing device.

3. The method of claim 1, wherein each of the non-overlapping groups of network addresses contains network addresses contained in a unique subset of the service rules, such that each service rule can be defined by a set of groupings of network addresses rather than by individual network addresses.

4. The method of claim 1, further comprising:
   updating the global table based on the received update to the at least one of the plurality of service rules, wherein generating the one or more VIF specific tables is based on the updated global table.

5. The method of claim 4, further comprising:
   determining an old network address group based on the global table prior to any change from the update of the global table; and determining a new network address group based on the global table including any changes from the update of the global table, wherein updating the non-overlapping groups of network addresses is based on the old network address group and the new network address group.

6. The method of claim 5, wherein:
determining the old network address group comprises determining overlapping service rules between the global group corresponding to a first network address of the plurality of network addresses and any of the previous service rules corresponding to the first network address of the plurality of network addresses; and
determining the new network address group comprises determining overlapping service rules between the global group corresponding to the first network address of the plurality of network addresses and any of the updated service rules corresponding to the first network address of the plurality of network addresses.

7. The method of claim 4, wherein:
each of the service rules comprises an applied-to field that corresponds the service rule to one or more of the VIFs; and
receiving the update comprises receiving at least one service rule with an updated applied-to field.

8. The method of claim 1, further comprising:
updating the service rules of the global group corresponding to the first network address to generate another global group corresponding to the first network address based on the received update, wherein updating the non-overlapping groups of network addresses is based on the other global group.

9. The method of claim 1, wherein the service rules are distributed firewall rules.

10. The method of claim 1, wherein each of the service rules corresponds to a source network address, and a destination network address.

11. The method of claim 1, wherein the network addresses are Internet Protocol (IP) addresses.

12. A non-transitory computer-readable medium having instructions stored thereon that when executed by one or more physical computing devices, cause the one or more physical computing devices to perform a method for managing service rules, the method comprising:
receiving a plurality of service rules, each service rule corresponding to one or more of a plurality of network addresses and at least one of a plurality of virtual interfaces (VIFs) associated with a plurality of virtual computing instances running on a first physical computing device;
grouping the plurality of network addresses into non-overlapping groups of network addresses;
generating a global table comprising a plurality of entries, each entry mapping a different one of the plurality of network addresses to a corresponding global group including each of the plurality of service rules that correspond to both the network address and to any of the plurality of VIFs;
storing the global table;
receiving an update to at least one of the plurality of service rules;
in response to receiving the update:
determining previous service rules corresponding to a first VIF of the plurality of VIFs based on the plurality of service rules;
determining updated service rules corresponding to the first VIF based on the update;
generating one or more VIF specific tables for the first VIF based on the stored global table, the previous service rules, and the updated service rules as opposed to storing a VIF specific table prior to receiving the update; and
updating the non-overlapping groups of network addresses based on the one or more VIF specific tables.

13. The non-transitory computer-readable medium of claim 12, wherein the plurality of VIFs correspond to ports on a virtual switch running on the first physical computing device.

14. The non-transitory computer-readable medium of claim 12, wherein each of the non-overlapping groups of network addresses contains network addresses contained in a unique subset of the service rules, such that each service rule can be defined by a set of groupings of network addresses rather than by individual network addresses.

15. The non-transitory computer-readable medium of claim 12, wherein the method further comprises:
updating the global table based on the received update to the at least one of the plurality of service rules, wherein generating the one or more VIF specific tables is based on the updated global table.

16. The non-transitory computer-readable medium of claim 15, wherein the method further comprises:
determining an old network address group based on the global table prior to any change from the update of the global table; and
determining a new network address group based on the global table including any changes from the update of the global table, wherein updating the non-overlapping groups of network addresses is based on the old network address group and the new network address group.

17. The non-transitory computer-readable medium of claim 16, wherein:
determining the old network address group comprises determining overlapping service rules between the global group corresponding to a first network address of the plurality of network addresses and any of the previous service rules corresponding to the first network address of the plurality of network addresses; and
determining the new network address group comprises determining overlapping service rules between the global group corresponding to the first network address of the plurality of network addresses and any of the updated service rules corresponding to the first network address of the plurality of network addresses.

18. The non-transitory computer-readable medium of claim 15, wherein:
each of the service rules comprises an applied-to field that corresponds the service rule to one or more of the VIFs; and
receiving the update comprises receiving at least one service rule with an updated applied-to field.

19. The non-transitory computer-readable medium of claim 12, wherein the method further comprises:
updating the service rules of the global group corresponding to a first network address to generate another global group corresponding to the first network address based on the received update, wherein updating the non-overlapping groups of network addresses is based on the other global group.

20. An apparatus for managing service rules, comprising:
means for receiving a plurality of service rules, each service rule corresponding to one or more of a plurality of network addresses and at least one of a plurality of virtual interfaces (VIFs) associated with a plurality of virtual computing instances running on a first physical computing device;

means for grouping the plurality of network addresses into non-overlapping groups of network addresses;

means for generating a global table comprising a plurality of entries, each entry mapping a different one of the plurality of network addresses to a corresponding global group including each of the plurality of service rules that correspond to both the network address and to any of the plurality of VIFs;

means for storing the global table;

means for receiving an update to at least one of the plurality of service rules;

in response to receiving the update:
- means for determining previous service rules corresponding to a first VIF of the plurality of IVFs based on the plurality of service rules;
- means for determining updated service rules corresponding to the first VIF based on the update;
- means for generating one or more VIF specific tables for the first VIF based on the stored global table, the previous service rules, and the updated service rules as opposed to storing a VIF specific table prior to receiving the update; and
- means for updating the non-overlapping groups of network addresses based on the one or more VIF specific tables.

* * * * *